(12) United States Patent
Carrillo

(10) Patent No.: US 7,921,812 B1
(45) Date of Patent: Apr. 12, 2011

(54) PORTABLE ANIMAL BATHING APPARATUS

(76) Inventor: Lorraine M. Carrillo, Camarillo, CA (US)

( * ) Notice: Subject to any disclaimer, the term of this patent is extended or adjusted under 35 U.S.C. 154(b) by 81 days.

(21) Appl. No.: 12/156,385

(22) Filed: Jun. 2, 2008

(51) Int. Cl.
*A01K 13/00* (2006.01)
*A01K 29/00* (2006.01)

(52) U.S. Cl. .................... 119/604; 119/602; 119/603

(58) Field of Classification Search .............. 119/602, 119/603, 604, 671, 673, 675, 676, 847, 849
See application file for complete search history.

(56) References Cited

U.S. PATENT DOCUMENTS

| | | | |
|---|---|---|---|
| 3,867,906 | A | 2/1975 | Johnson |
| 4,549,502 | A | 10/1985 | Namdari |
| 5,193,487 | A | 3/1993 | Vogel |
| 5,213,064 | A | 5/1993 | Mondine et al. |
| D342,120 | S | 12/1993 | Dixon, Jr. |
| 5,279,257 | A | 1/1994 | Temby |
| 5,448,966 | A | 9/1995 | McKinnon et al. |
| 5,632,231 | A | 5/1997 | Moore |
| 5,678,511 | A | 10/1997 | Day |
| 5,711,252 | A | 1/1998 | Brandolino |
| D404,853 | S | 1/1999 | Foster et al. |
| 5,974,601 | A | 11/1999 | Drane et al. |
| 6,516,752 | B2 * | 2/2003 | Batterton ............ 119/650 |
| 7,021,555 | B2 * | 4/2006 | Bagnall .................. 239/1 |
| 7,080,608 | B1 * | 7/2006 | Arndt et al. ........... 119/671 |
| 2006/0102084 | A1 * | 5/2006 | Garfield ................ 119/165 |

* cited by examiner

*Primary Examiner* — Timothy D Collins
*Assistant Examiner* — Joshua Huson
(74) *Attorney, Agent, or Firm* — Albert O. Cota

(57) ABSTRACT

A portable animal bathing apparatus (10) that comprises an enclosure (12) having a front panel (14), a rear panel (16), a right panel (18), a left panel (20), a bottom panel (22), an upper edge (24) and a lower edge (26). The enclosure (12) is preferably rectangular shaped an extending downward from each corner of the enclosure is a preferably height adjustable leg (68). A curtain (104) extends upward for the upper edge (24) of the enclosure (12). The curtain (104) is supported by four curtain posts (112). A combination swing ramp and cover (116) extends downward from the right panel (18) of the enclosure (12). The swing ramp and cover (116) allows an animal to be walked up and into the enclosure (12), and also functions as a cover for the enclosure (12) when not in use. A water pump (136) and water reservoir (140) are located in the enclosure (12), within a protective enclosure (144). A shower hose (152) is attached to the water pump (136) to provide directional water spraying during an animal bathing session.

12 Claims, 5 Drawing Sheets

PORTABLE ANIMAL BATHING APPARATUS

TECHNICAL FIELD

The invention generally pertains to portable animal bathing and washing devices, and more particularly to a portable bathing apparatus for animals and pets such as dogs.

BACKGROUND ART

Throughout history, mankind has caught and maintained animals for various purposes. Some animals are kept in zoos for observation by the public and study by professionals. Other animals are utilized for food production and/or labor. And finally, there are animals that have been domesticated, such as dogs and cats, to provide companionship for humans.

The most numerous of those groups of animals is those that have been domesticated. For many individuals and families, their animal, or pet, is an integral part of the household. For people who are alone, a pet is often their closes companion.

It is no surprise therefore that many pets are allowed to live indoors, within a person's or family's home. But, just as humans require regular bathing to maintain health and hygiene, a pet does as well. If a domestic pet, such as a dog, does not receive regular bathing, it can lead to problems for the pet and the humans in the household.

As a result, most responsible pet owners ensure that their pet receives regular bathings. There are basically the choices available for pet bathing: either the pet owner does it themselves, or they take the pet to a professional, such as a pet groomer. Regardless of who does the actual bathing, it often is difficult. Many animals are not accustomed to remaining still while being shampooed and then soaked with water. Even well-trained animals can be difficult to bathe.

There have been attempts made to provide bathing devices or apparatuses for animals, but many of those do not consider all the requirements. Most people who bathe their own pets either use the family bathtub, which is not particularly hygienic for the family, or they simply spray the pet with a garden hose, which not only wastes water but usually requires two people-one to hold the pet and one to hold the hose. It is no surprise that many pets do not like being sprayed with the often high-pressure water coming from a garden hose.

Obviously, it would be extremely beneficial to provide a dedicated portable animal bathing apparatus that would be portable, easily to use and that would provide the animal or pet with a clean, safe environment in which the pet would feel comfortable. An apparatus such as this could be used by professional animal/pet bathers and by typical pet owners, and would optimally include humane means of restraining an animal or pet so that a single person could perform the bathing session.

A search of the prior art did not disclose any patents that read directly on the claims of the instant invention. However, the following U.S. patents are considered related:

| PAT. NO. | INVENTOR | ISSUED |
| --- | --- | --- |
| 5,213,064 | Mondine, et al | 25 May 1993 |
| 5,279,257 | Temby | 18 Jan. 1994 |
| 5,632,231 | Moore | 27 May 1997 |

The U.S. Pat. No. 5,213,064 discloses a portable animal bath apparatus that includes a housing in which an animal is confined, a hand-held shower device, and a moveable spray device positionable under the animal. The housing includes two half doors for facilitating ingress and egress of the animal, and the housing is narrow enough to confine the animal so as to limit its movement. The spray device may be attached to a flexible tube and includes a sponge attached to an end of the tube so that random whipping action of the tube causes a continuous washing motion to occur.

The U.S. Pat. No. 5,279,257 discloses a portable pet washing and grooming apparatus. The apparatus maintains washing fluids within the apparatus from leaking or escaping beyond the apparatus confines which causes a user to stay dry while washing or grooming a pet. The apparatus has a flexible transparent upper easing that is permanently bonded to a rigid tub. The upper casing has a dorsal aperture for entry of an animal into the apparatus, a head opening through which the head of the animal can extend, and slide fastener sections and a slider for opening and closing the dorsal aperture and head opening.

The U.S. Pat. No. 5,632,231 discloses a pet shower devices comprising a base that is sized to receive a pet, with the head of the pet extending outward from a front wall of the base. A cover is hinged at one side to the base. When the cover is in a closed position over the base, a front wall of the cover will fit about a neck of the pet. A structure carried within the base and the cover is for scattering small drops of water on the body of the pet, so as to clean the body of the pet.

For background purposes and as indicative of the art to which the invention is related reference may be made to the remaining patents located in the search:

| PAT. NO. | INVENTOR | ISSUED |
| --- | --- | --- |
| Des.342,120 | Dixon, Jr. | 7 Dec. 1993 |
| Des.404,853 | Foster, et al | 26 Jan. 1999 |
| 3,867,906 | Johnson | 25 Feb. 1975 |
| 4,549,502 | Namdari | 29 Oct. 1985 |
| 5,193,487 | Vogel | 16 Mar. 1993 |
| 5,448,966 | McKinnon et al | 12 Sep. 1995 |
| 5,678,511 | Day | 21 Oct. 1997 |
| 5,711,252 | Brandolino | 27 Jan. 1998 |
| 5,974,601 | Drane, et al | 2 Nov. 1999 |

DISCLOSURE OF THE INVENTION

In its most basic design, the portable animal bathing apparatus is comprised of an enclosure having a front panel, a rear panel, a right panel, a left panel, a bottom panel, an upper edge, and a lower edge. The enclosure is preferably rectangular shaped and extending downward from each of the enclosures four corners is a leg. Preferably, each of the four legs is height adjustable from 12" to 30". A curtain extends upward from the upper edge of the enclosure. The curtain surrounds the two sides and the rear above the enclosure and is supported by four curtain posts that extend upward; from each corner of the enclosure. The curtain protects against water splashing outward during an animal bathing session and, when not in use, the curtain can be rolled out of the way.

Extending downward from the right panel of the enclosure is a swing ramp and cover. The ramp and cover serves two purposes: first, when used as a ramp, it allows an animal to be walked up and into the enclosure for a bathing session. Second, the ramp and cover is dimensioned to fit over the open top of the enclosure to provide a cover when the apparatus not in use.

Located within the enclosure is a water pump and water reservoir. Both the pump and the reservoir are covered by a protective enclosure. The water pump, which is preferably battery powered, and the water reservoir are utilized to provide the clean water that is needed during an animal bathing session.

A shower hose, either with or without a lever-activated nozzle, is attached to the water pump to allow directional spraying of water on an animal during a bathing session.

If desired, wheels may be placed on two of the legs to allow the portable animal bathing apparatus to be easily moved from one location to another.

In view of the above disclosure, the primary object of the invention to provide a portable animal bathing apparatus that will allow a person to quickly and easily bathe an animal in a safe and secure enclosed environment.

In addition to the primary object, it is also an object of the invention to provide a portable animal bathing apparatus that:
is easily transported for use and stored when not in use,
is made in a variety of sizes to accommodate large and small animals and pets,
is easily cleaned after use,
reduces the amount of water that is wasted during other bathing methods, such as using a garden hose,
allows a person to maintain control over an animal during a bathing session, provides a dedicated bathing area for an animal or pet, which reduces the use of shared human and animal bathing areas (such as a bathtub),
can be used with warm water for the comfort of the animal, and
is cost effective from both a manufacturer's and a consumer's point of view.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
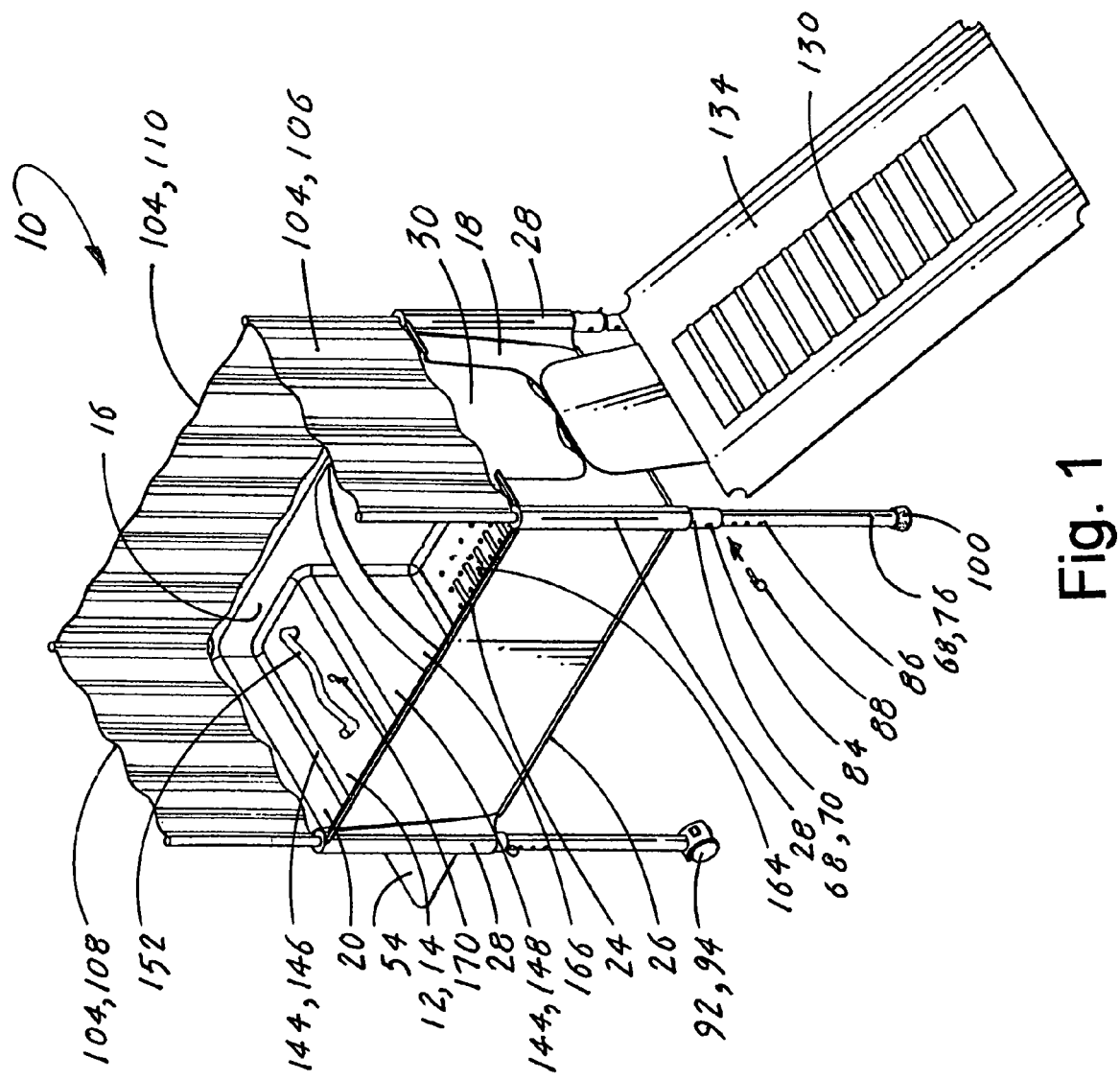
FIG. 1 is a perspective front view of the portable animal bathing apparatus showing an extended swing ramp and cover.

The best mode for carrying out the invention is presented in terms of a preferred embodiment for a portable animal bathing apparatus, (hereinafter "PABA 10"). Since the PABA 10 is self-contained, a person can quickly and easily transport and set up the PABA 10 at almost any indoor or outdoor location. Additional benefits include providing a safe, clean environment for an animal or pet that is being bathed, conserving water that is typically wasted when using other animal bathing methods, and providing a dedicated animal bathing device that is not shared with humans, (such as a bathtub).

As shown in FIGS. 1-5, the PABA 10 is comprised of the following major elements: an enclosure 12, four legs 68, a swing ramp and cover 116, a water pump 136, a water reservoir 140 and a shower hose 152.

The enclosure 12, as shown in FIGS. 1-5, is comprised of a front panel 14, a rear panel 16, a right panel 18, a left panel 20, a bottom panel 22, an upper edge 24 and a lower edge 26. The enclosure 12 is preferably rectangular shaped, although other shapes, such as elliptical, can also be utilized. The enclosure 12 must be impervious to damage from water, and also must be lightweight to allow portability. Therefore, the preferred material for the enclosure 12 is plastic, although fiberglass or aluminum can also be utilized.

Figure 2:
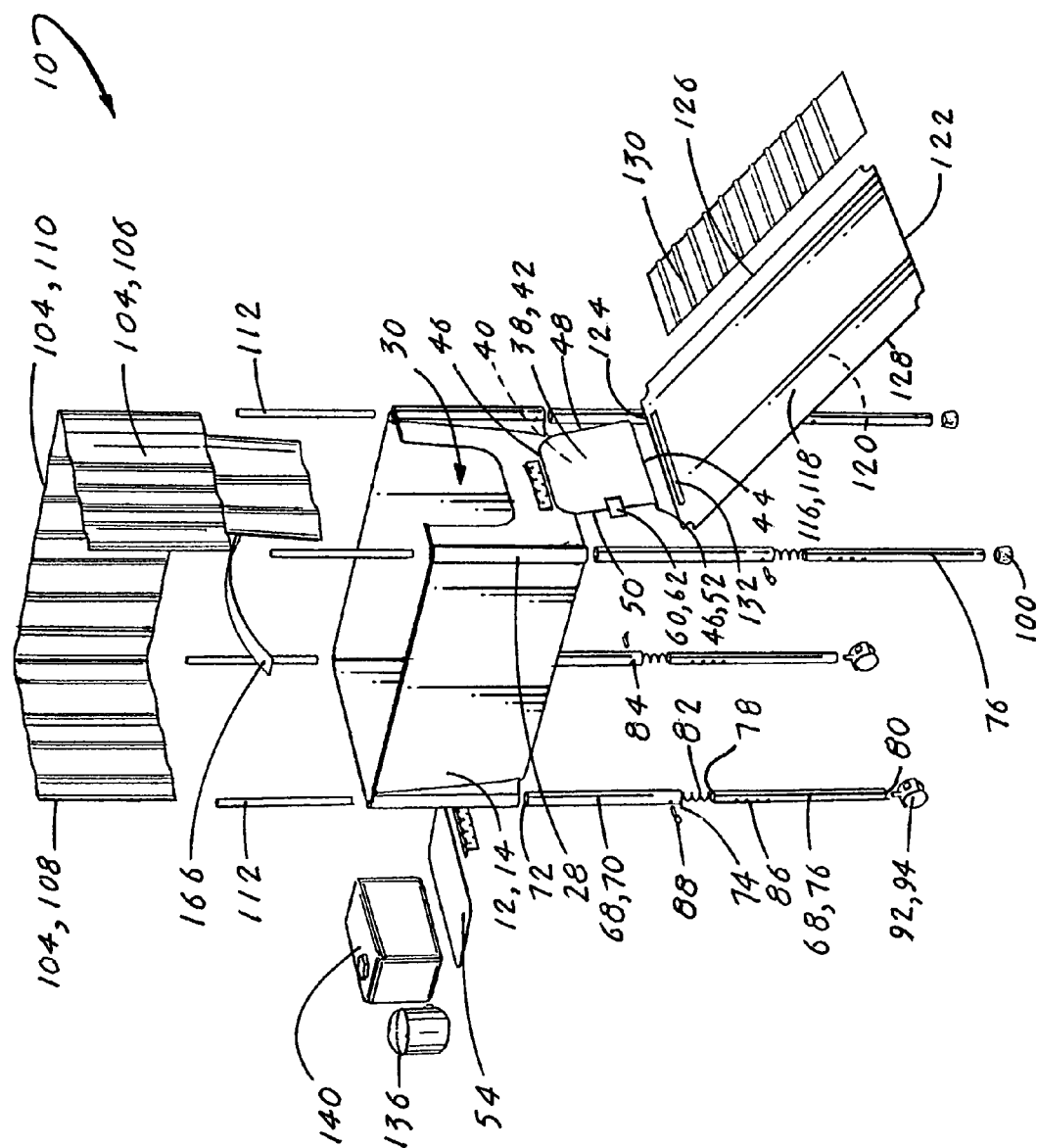
FIG. 2 is an exploded, perspective front view of the portable animal bathing apparatus.
Figure 3:
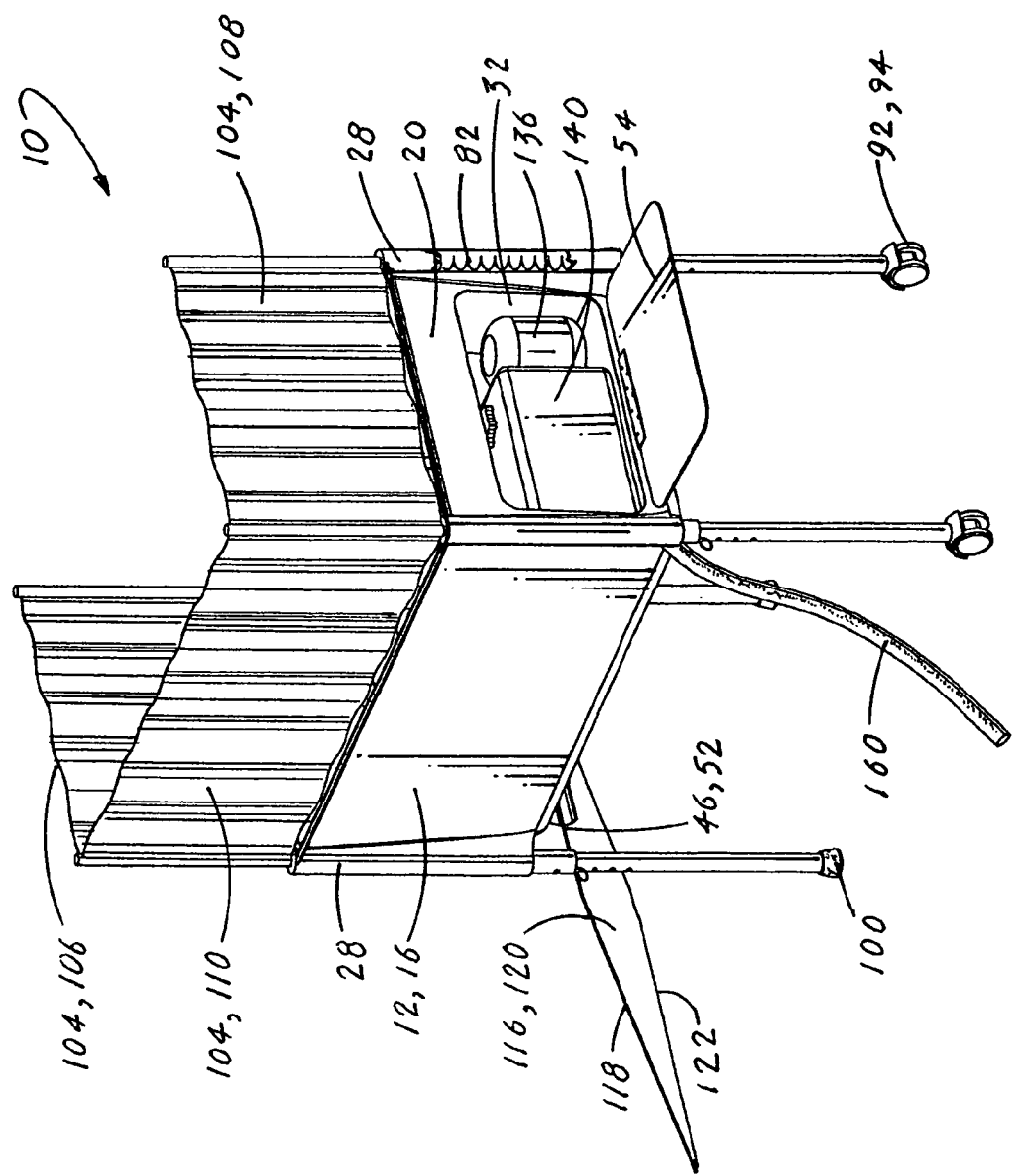
FIG. 3 is a perspective rear view of the portable animal bathing apparatus.
Figure 5:
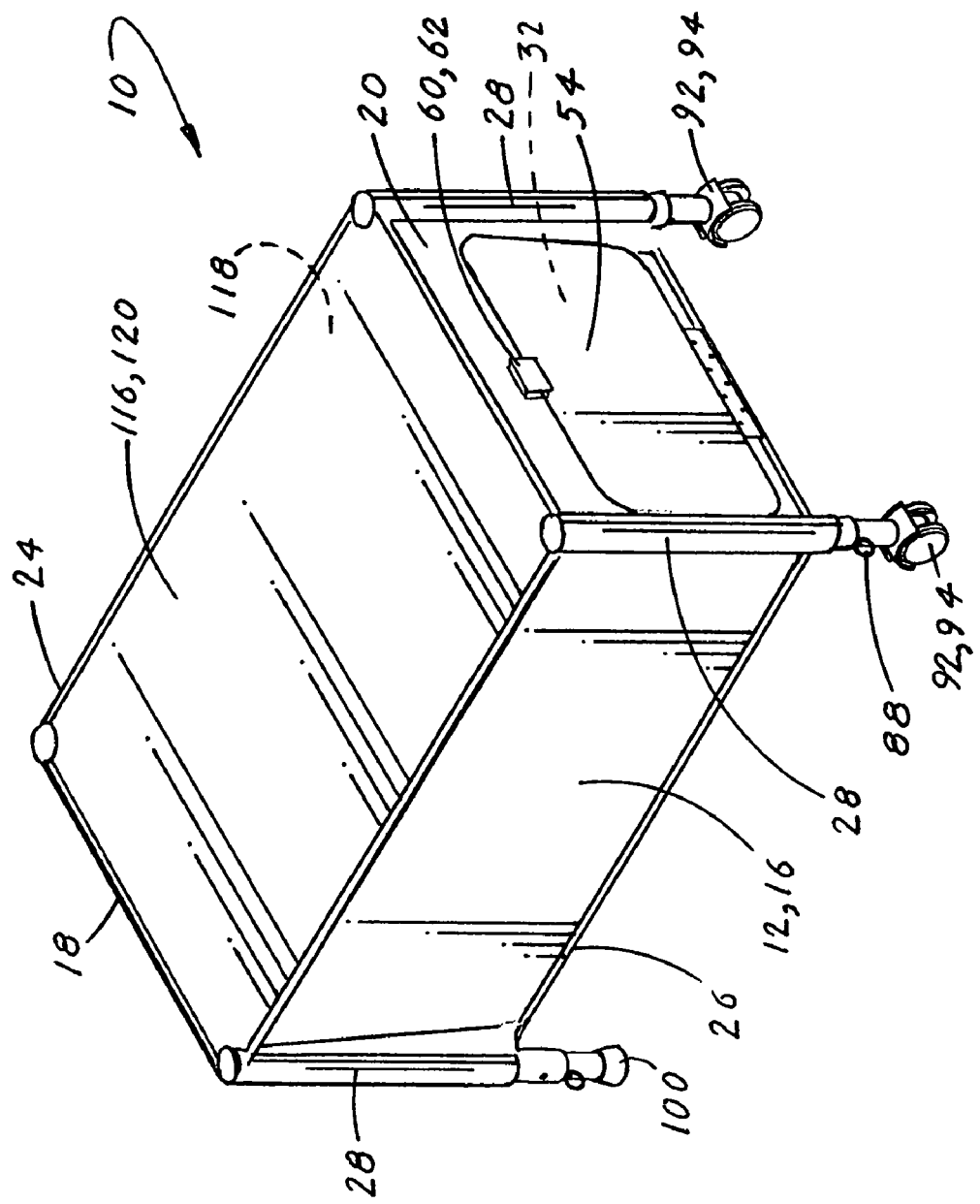
FIG. 5 is a perspective view showing the portable animal bathing apparatus with a cover over the enclosure and the legs fully retracted.

Located at each corner of the enclosure 12 is a hollow tube 28 that extends from the lower edge 26 to the upper edge 24. As shown in FIGS. 1 and 2, located on the right panel 18 is a substantially U-shaped right opening 30 that extends downward from the enclosure's upper edge 24, and that allows access to the interior of the enclosure 12. As shown in FIGS. 3 and 5, located on the left panel 20 is a left opening 32 that allows access to the interior of the enclosure 12.

As shown in FIGS. 1 and 2, an exterior right hinged door 38 is dimensioned to cover the U-shaped right opening 30. The right hinged door 38 is comprised of an outer surface 40, an inner surface 42, an upper edge 44, a lower edge 46, a right edge 48 and a left edge 50, with the upper edge 44 having an outward-extending curved lip 52. The right hinged door 38 is designed to swing open downward and is maintained in closed position over the U-shaped right opening 30 by a securing means 60, which preferably comprises a latch 62, as shown in FIG. 2.

As shown in FIGS. 1-5, an exterior left hinged door 54 is dimensioned to cover the left opening 32. The left hinged door 54 is maintained in a closed position over the left opening 32 by the same securing means 60, which is preferably a latch 62, as shown in FIG. 5, that is utilized for the right hinged door 38.

Figure 4:
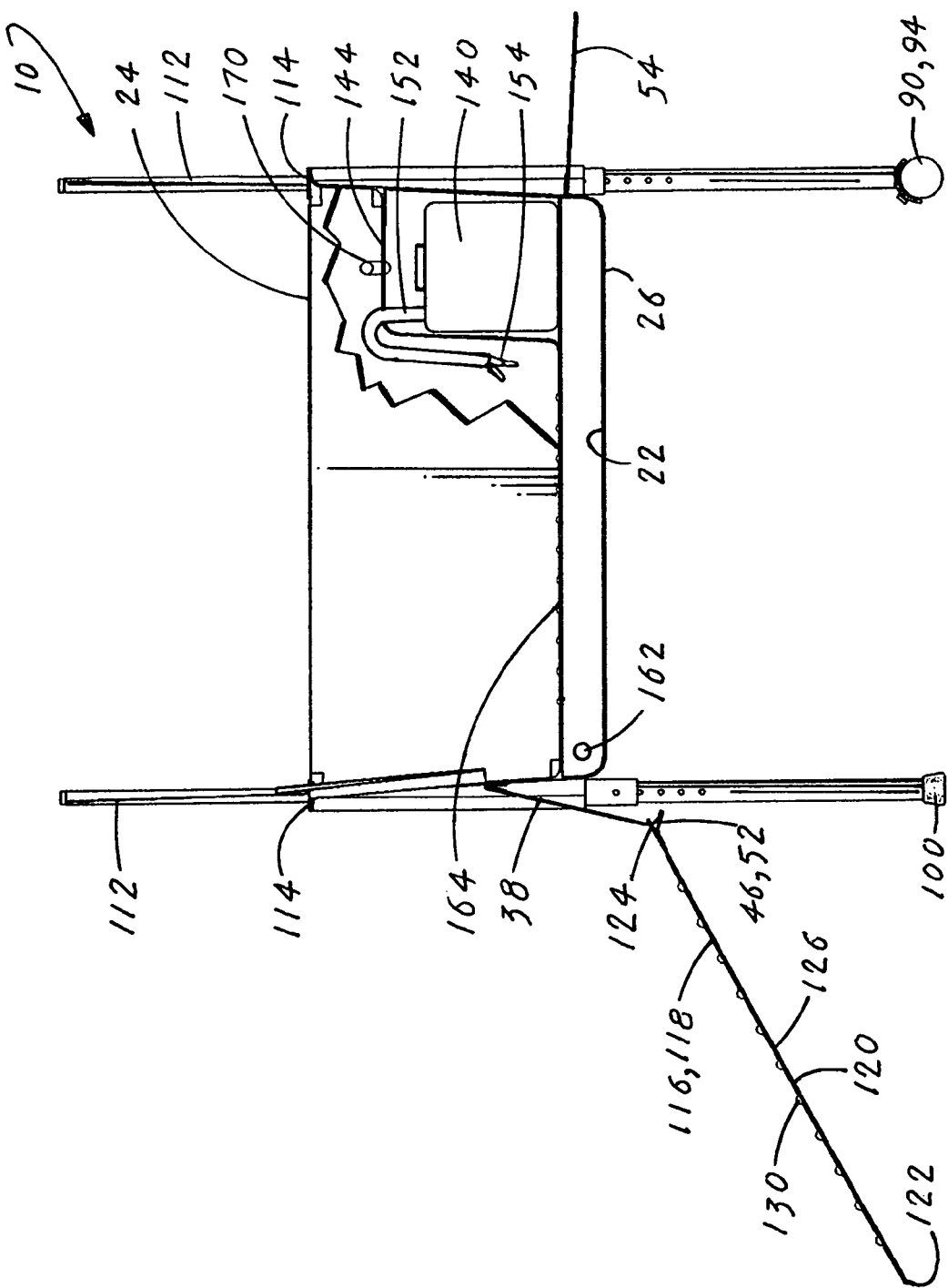
FIG. 4 is a side elevational view of the rear of the portable animal bathing apparatus.

As shown in FIGS. 1-4, one of the legs 68 extends downward from each corner of the enclosure 12. The four legs 68 are each made of a material that is selected from the group consisting of aluminum, stainless steel, plastic or fiberglass. Each leg 68 is comprised of an upper tube structure 70 having an upper end 72 or a lower end 74, and a lower tube structure 76 having an upper end 78 and a lower end 80. The upper end 72 of one of the upper tube structures 70 interfaces with and extends downward from the bottom of each hollow tube 28 on the enclosure 12, thereby providing a leg 68 at each corner of the enclosure 12. Each lower tube structure 76 is dimensioned to fit within one of the upper tube structures 70 and to be height adjustable by use of a compression spring 82 within the upper tube structure 70, as shown in FIG. 2, or within the hollow tube 28, as shown in FIG. 3. The spring 82 applies downward pressure on the lower tube structure 76 to maintain the lower tube structure from sliding upward into the upper tube structure 70. A person can push downward on the enclosure 12 which will force the upper tube structure 70 upward into the hollow tube 28 and downward over the lower tube structure 76. Extending through the upper tube structure 70, adjacent to the lower end 74, is a bore 84. Extending downward from the upper end 78 of the lower tube structure 76 is a plurality of equal-sized bores 86. Once a desired height is achieved by applying downward pressure on the enclosure 12, a position pin 88, as shown in FIGS. 1, 2 and 3, is inserted through the aligned bores 84,86 on the upper tube structure 70 and the lower tube structure 76, thereby maintaining the lower tube structure 76 within the upper tube structure 70 at the desired height. Preferably, the height will be variable from 2-inches (5.08 cm), as shown in FIGS. 5, to 30-inches (76.20 cm), as shown in FIGS. 1, 3 and 4. Additionally, in an alternate design, the legs 68 can be non-height adjustable.

As shown in FIGS. 1-5, two wheels, which are either locking wheels 92 that can be locked in a non-moving position, or non-locking wheels 94, are utilized. One wheel 92 or 94 is attached to the lower end 80 of the lower tube structure 76 located at the corners of the left side of the enclosure 12. The wheels 92 or 94 allow the enclosure 12 to be tipped upwards from the right side and then pushed or pulled to a desired location. Additionally, either type of wheel 92 or 94 can include a pop-in pop-out mechanism which allows the wheel to be easily attached to, or removed from the lower end 80 of the lower tube structure 76.

As shown in FIGS. 1-5, there are also two leg caps 100. One cap 100 is attached to the lower end 80 of the lower tube structure 76 located at the corners of the left side of the enclosure 12. The leg caps 100 prevent the enclosure 12 from moving from a desired location.

As shown in FIGS. 1-3, a curtain 104 having a right section 106, a left section 108 and a rear section 110 extends upward from the respective right panel 18, left panel 20 and rear panel 16 of the enclosure 12. The curtain 104 is maintained in position by the use of four curtain posts 112. Each post 112 extends upward from and is attached, by an attachment means 114, to the hollow tube 28 located at each corner of the enclosure 12, as shown in FIGS. 1, 2 and 4. The attachment means 114 is selected from the group consisting of a nut and bolt, a screw, welding, or an adhesive. The curtain 104 is designed to be rollable across the area above each panel section, thereby providing either selectably limited or complete protection against water splashing outward from the enclosure 12, as shown in FIG. 2, a section of curtain can also extend downward from the curtain's right section to cover the U-shaped right opening 30.

The combination swing ramp and cover 116, as shown in FIGS. 1-4, has an upper surface 118, a lower surface 120, a front edge 122, a rear edge 124, a right edge 126, and a left edge 128, with a non-slip material 130 on the upper surface 118. Additionally, in lieu of a non-slip material 130, a multiplicity of upward-extending ridges or bumps can be utilized to provide traction on the swing ramp and cover 116. Located adjacent to the rear edge 124 is an opening 132 that extends through the swing ramp and cover 116. The opening 132 is dimensioned to accept the curved lip 52 that extends downward from the right hinged door 38. When the right hinged door 38 is in an open downward position, the swing ramp and cover 116 can be attached onto the right hinged door 38 by inserting the opening 132 over the curved lip 52, as shown in FIGS. 2 and 4, thereby providing a ramp that extends upward from the ground to the lower edge of the U-shaped right opening 30. An animal can then be walked up the swing ramp and cover 116, through the U-shaped right opening 30, and into the enclosure 12. The combination swing ramp and cover 116 is also dimensioned so that when it is not being utilized as a ramp, it can be placed on the upper edge 24 of the enclosure 12 to provide a cover for the enclosure 12, as shown in FIG. 5. In an alternate design, the right hinged door and the combination swing ramp and cover can be made as a single, integral element. As shown in FIG. 1, the integral door, swing ramp and cover 134 is hingedly attached to the exterior of the enclosure's right panel 18 below the U-shaped right opening 30. When the integral door, swing ramp and cover 134 is being used in an open downward position it allows an animal to be walked up the ramp and into the enclosure 12. When the integral door, swing ramp and cover 134 is not in use, it can be swung upward, thereby providing a door for the U-shaped right opening 30 and a cover for the enclosure 12, as shown in FIG. 5.

As shown in FIGS. 2 and 3, the water pump 136, which is preferably battery powered, is located within the enclosure 12 adjacent to the left panel 20. The water reservoir 140, as also shown in FIGS. 2, 3 and 4, is located within the enclosure 12 and is connected to and adjacent to the water pump 136. The water reservoir 140, which can be made of plastic, fiberglass or aluminum is utilized to contain the clean water that is used during an animal bathing session. Access to both the water pump 136 and the water reservoir 140 is achieved by use of the left hinged door 54.

As shown in FIGS. 1 and 4, both the water pump 136 and the water reservoir 140 are within a protective enclosure 144. The protective enclosure 144, which has an upper section 146 and a side section 148, is located within the enclosure 12 and completely encloses the water pump 136 and water reservoir 140.

As shown in FIGS. 1 and 4, a shower hose 152 extends outward from and through the upper section 146 of the protective enclosure 144. The shower hose 152 is connected to the water pump 136 to allow directional spraying of water on an animal during a bathing session. If desired, a lever-activated nozzle 154, as also shown in FIGS. 1 and 4, can be attached to the end of the shower hose 152.

As shown in FIG. 3, a drain hose 160 extends outward from the rear panel 16 of the enclosure 12. The drain hose 160 allows waste water to be emptied from the enclosure 12. In lieu of a drain hose 160, a water release valve 162 can be located on the enclosure 12, as shown in FIG. 4, to empty waste water from the enclosure 12.

In order to assist a person in maintaining an animal within the enclosure 12 during a bathing session, three elements are provided. First, a non-slip mat 164 is located within the enclosure 12 on the bottom panel 22, as best shown in FIG. 1. The mat 164 helps prevent an animal from slipping and sliding while in the enclosure 12. Second, a hold-down strap 166 is located at the upper edge 24 and extends across the enclosure 12 from the front panel 14 to the rear panel 16, as shown in FIGS. 1 and 2. The hold-down strap 166, which can be made of waterproof leather or another material, rubber or plastic, is utilized to maintain an animal within the enclosure 12 during a bathing session. And third, a collar hold-down pin 170 is attached to the upper section of the water pump and water reservoir protective enclosure 144, as shown in FIGS. 1 and 4. The collar hold-down pin 170 allows an animal wearing a collar to be maintained within the enclosure 12 during a bathing session by attaching the collar to the pin 170.

While the invention has been described in detail and pictorially shown in the accompanying drawings it is not to be limited to such details, since many changes and modifications may be made to the invention without departing from the spirit and the scope thereof. For example, the water pump can also be non-powered by utilizing a manually-actuated water pump. Hence, it is described to cover any and all modifications and forms which may come within the language and scope of the claims.

The invention claimed is:

1. A portable animal bathing apparatus comprising:
    a) an enclosure having a front panel, a rear panel, a right panel, a left panel, a bottom panel, an upper edge and a lower edge, wherein said enclosure is rectangular shaped and located at each corner of said enclosure is a hollow tube that extends from the lower edge to the upper edge, wherein located on the right panel is a substantially U-shaped right opening that extends downward from the upper edge, and that allows access to the interior of said enclosure, wherein located on the left panel is a left opening that allows access to the interior of said enclosure, b) an exterior right hinged door that is dimensioned to cover the U-shaped right opening, wherein the right hinged door is comprised of an outer surface, an inner surface, an upper edge, a lower edge, a right edge and a left edge, with the upper edge having an outward-extending curved lip, wherein the right hinged door is designed to swing open downward and is maintained in a closed position over the U-shaped right opening by a door securing means, c) an exterior left hinged door that is dimensioned to cover the left opening, wherein the left hinged door is maintained in a closed position over the left opening by a door securing means, d) four legs, with one leg extending downward from each corner of said enclosure, wherein each leg is comprised of an upper tube structure having an upper end and a lower end, and a lower tube structure having an upper end and a lower end, wherein one of the upper tube structures extends downward from and is dimensioned to fit within each hollow tube structure on said enclosure, wherein each lower tube structure is dimensioned to fit within one of the upper tube structures and to be height adjustable by use of a compression spring within the upper tube structure or the hollow tube that applies downward pressure on the lower tube structure to maintain the lower tube structure from sliding upward into the upper tube structure, wherein a person can push downward on said enclosure which will force the upper tube structure down over the lower tube structure, wherein extending through the upper tube structure, adjacent to the lower end, is a bore, and extending downward from the upper end of the lower tube structure is a plurality of equal-sized bores, wherein once a desired height is achieved by applying downward pressure on said enclosure, a position pin is inserted through the aligned bores on the upper tube structure and the lower tube structure, thereby maintaining the lower tube structure within the upper tube structure at the desired height, e) two locking wheels, with one wheel attached to the lower end of the lower tube structures located at the corners of the left side of said enclosure, wherein said wheels allow said enclosure to be tipped upwards from the right side and then pushed or pulled to a desired location, f) two leg caps, with one cap attached to the lower end of the lower tube structure located at the corners of the right side of said enclosure, wherein said leg caps prevent said enclosure from moving from a desired location, g) a curtain having a right section, a left section and a rear section, wherein said curtain extends upward from the respective right panel, left panel and rear panel of said enclosure, wherein said curtain is maintained in position by the use of four curtain posts, with each post extending upward from and attached to, by an attachment means, the hollow tube located at each corner of said enclosure, wherein said curtain is designed to be rollable across the area above each panel section, thereby providing either selectably limited or complete protection against water splashing outward from said enclosure, h) a combination swing ramp and cover having an upper surface, a lower surface, a front edge, a rear edge, a right edge and a left edge, with a non-slip material on the upper surface, wherein located adjacent to the rear edge is an opening that extends through said swing ramp and cover, wherein the opening is dimensioned to accept the curved lip that extends downward from the right hinged door, wherein when the right hinged door is in an open downward position, said swing ramp and cover can be attached onto the right hinged door by inserting the opening over the curved lip, thereby providing a ramp that extends upward from the ground to the lower edge of the U-shaped right opening, wherein an animal can be walked up said swing ramp and cover, through the U-shaped right opening and into said enclosure, wherein said swing ramp and cover is dimensioned so that when it is not being utilized as a ramp, said swing ramp and cover can be placed on the upper edge of said enclosure to provide a cover for said enclosure, i) a battery powered water pump that is located within said enclosure adjacent to the left panel, wherein access to said water pump is achieved by use of said left hinged door, j) a water reservoir that is located within said enclosure and is connected to and adjacent to said water pump, wherein said reservoir is utilized to contain the clean water that is used during an animal bathing session, wherein access to said water reservoir is achieved by use of said left hinged door, k) a water pump and water reservoir protective enclosure having an upper section and a side section, wherein said protective enclosure is located within said enclosure and completely encloses said battery powered water pump and said water reservoir, l) a shower hose that extends outward from and through the upper section of the water pump and water reservoir protective enclosure, wherein said shower hose is connected to said water pump to allow directional spraying of water on an animal during a bathing session, m) a drain hose that extends outward from the rear panel of said enclosure, wherein said drain hose allows waste water to be emptied from said enclosure, n) a non-slip mat that is located within said enclosure on the bottom panel, o) a hold-down strap that is located at the upper edge and extends across said enclosure from the front panel to the rear panel, wherein said hold-down strap is utilized to maintain an animal within said enclosure during a bathing session, and p) a collar hold-down pin that is attached to the upper section of the water pump and water reservoir protective enclosure, wherein said collar hold down pin allows an animal wearing a collar to be maintained within said enclosure during a bathing session by attaching the collar to said pin.

2. The portable animal bathing apparatus as specified in claim 1 wherein said enclosure is made of a material selected from the group consisting of plastic, fiberglass, and aluminum.

3. The portable animal bathing apparatus as specified in claim 1 wherein said four legs are made of a material selected from the group consisting of aluminum, stainless steel, plastic, and fiberglass.

4. The portable animal bathing apparatus as specified in claim 1 wherein said four legs are height adjustable from 2-inches (5.08 cm) to 30-inches (76.20 cm).

5. The portable animal bathing apparatus as specified in claim 1 wherein the securing means for maintaining said right hinged door and said left hinged door are comprised of a latch.

6. The portable animal bathing apparatus as specified in claim 1 wherein the means for attaching the curtain posts to the hollow tube to each corner of said enclosure is selected from the group consisting of a nut and bolt, a screw, welding and an adhesive.

7. The portable animal bathing apparatus as specified in claim 1 wherein said right hinged door and said combination swing ramp and cover are a single integral element, wherein said integral door, swing ramp and cover is hingedly attached to the exterior of said enclosure's right panel below said U-shaped right opening.

8. The portable animal bathing apparatus as specified in claim 1 wherein said curtain is made of plastic.

9. The portable animal bathing apparatus as specified in claim 1 wherein said water reservoir is made of a material selected from the group consisting of plastic, fiberglass and aluminum.

10. The portable animal bathing apparatus as specified in claim 1 wherein said hold-down strap is made of a material selected from the group consisting of waterproof leather, rubber, and plastic.

11. The portable animal bathing apparatus as specified in claim 1 wherein said shower hose further comprising a lever-activated nozzle.

12. The portable animal bathing apparatus as specified in claim 1 further comprising a water release valve.

\* \* \* \* \*